United States Patent
Kest et al.

[11] Patent Number: 5,769,197
[45] Date of Patent: *Jun. 23, 1998

[54] CLUTCH ASSEMBLY FOR AN EXERCISE APPARATUS

[75] Inventors: Anthony Michael Kest, 29600 Franklin Rd., #22, Southfield, Mich. 48034; Joseph Unkyung Han, Rancho Cucamonga, Calif.

[73] Assignee: Anthony Michael Kest, Southfield, Mich.

[ * ] Notice: The term of this patent shall not extend beyond the expiration date of Pat. No. 5,634,874.

[21] Appl. No.: 745,744

[22] Filed: Nov. 12, 1996

Related U.S. Application Data

[63] Continuation of Ser. No. 595,738, Feb. 2, 1996, Pat. No. 5,634,874.

[51] Int. Cl.⁶ .................................................... F16D 41/00
[52] U.S. Cl. .................... 192/46; 192/69.81; 192/109 R
[58] Field of Search ........................ 192/46, 69.3, 69.81, 192/109 R

[56] References Cited

U.S. PATENT DOCUMENTS

| | | |
|---|---|---|
| Re. 23,744 | 11/1953 | Magida . |
| 2,307,856 | 1/1943 | Porter . |
| 2,742,127 | 4/1956 | Mumford et al. ................... 192/69.81 |
| 2,869,697 | 1/1959 | Marshall ........................ 192/69.81 X |
| 3,315,959 | 4/1967 | Carnielli . |
| 3,826,480 | 7/1974 | Johnson et al. . |
| 3,971,255 | 7/1976 | Varney et al. . |
| 4,028,795 | 6/1977 | Pauls . |
| 4,111,417 | 9/1978 | Gardner . |
| 4,284,272 | 8/1981 | Evans et al. . |
| 4,374,588 | 2/1983 | Ruggles . |
| 4,580,778 | 4/1986 | Van Noord . |
| 4,728,102 | 3/1988 | Pauls . |
| 4,844,449 | 7/1989 | Truslaske . |
| 5,007,631 | 4/1991 | Wang . |
| 5,031,741 | 7/1991 | Otto ....................................... 192/69.3 |
| 5,037,088 | 8/1991 | Bernstein . |
| 5,071,116 | 12/1991 | Minear . |
| 5,092,582 | 3/1992 | Pertramer . |
| 5,131,895 | 7/1992 | Rogers, Jr. . |
| 5,147,265 | 9/1992 | Pauls et al. . |
| 5,154,684 | 10/1992 | Delf . |
| 5,158,519 | 10/1992 | Hughes . |
| 5,167,596 | 12/1992 | Ferber . |
| 5,242,340 | 9/1993 | Jerome . |
| 5,260,870 | 11/1993 | Tsuchiya et al. . |
| 5,295,935 | 3/1994 | Wang . |
| 5,437,591 | 8/1995 | Chen . |
| 5,509,879 | 4/1996 | Lanzagorta . |

FOREIGN PATENT DOCUMENTS 263000  12/1988  Germany .

*Primary Examiner*—Richard M. Lorence

[57] ABSTRACT

A quiet, smoothly operating, one-way clutch assembly for use in an exercise device is provided. The clutch assembly includes a drive member, a drive clutch member operably coupled to the drive member for movement therewith, and a driven member engagable with the drive member. When rotated in a first direction, the drive member engages the driven member to transfer torque therebetween. When rotated in a second direction, the drive member disengages the driven member to permit relative rotation therebetween. The drive clutch member is moveable relative to the drive member to provide a relatively flat surface upon which the driven member may rotate relative to the drive member.

16 Claims, 2 Drawing Sheets

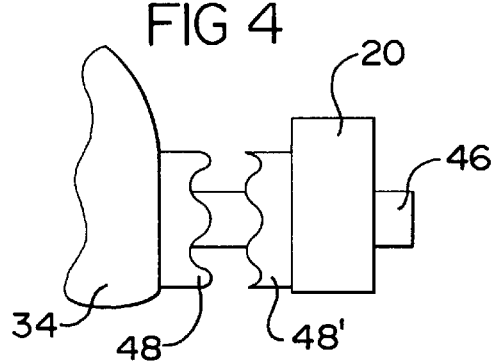
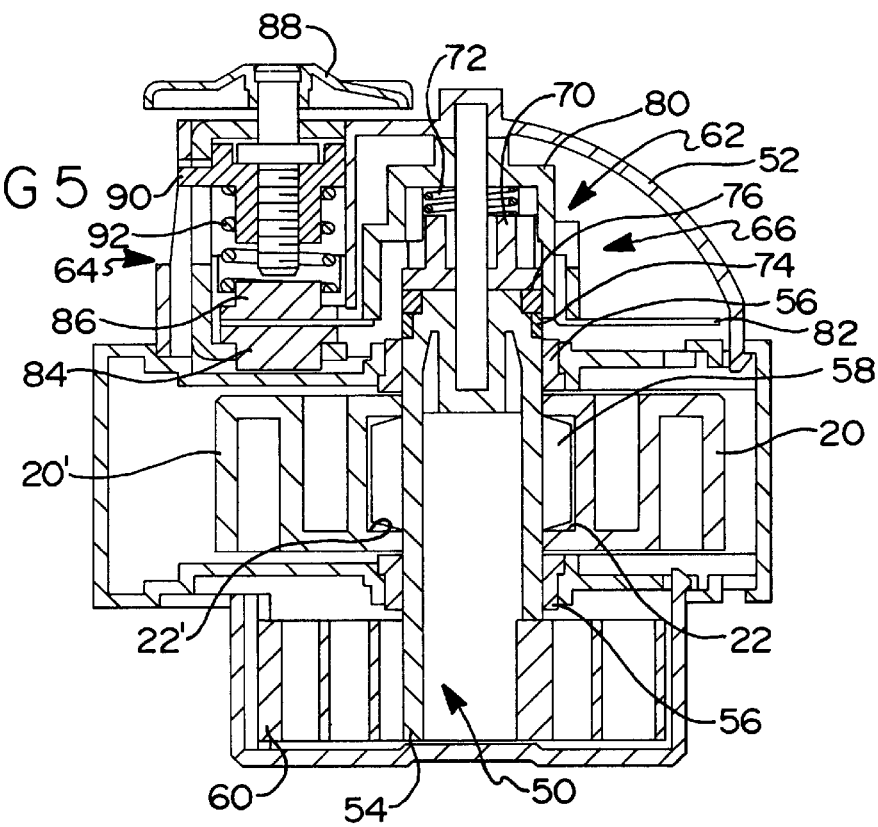
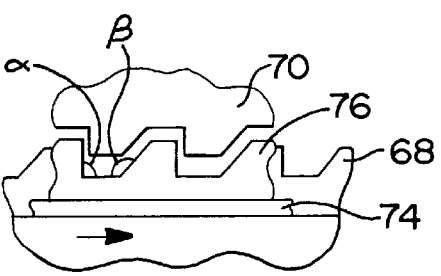
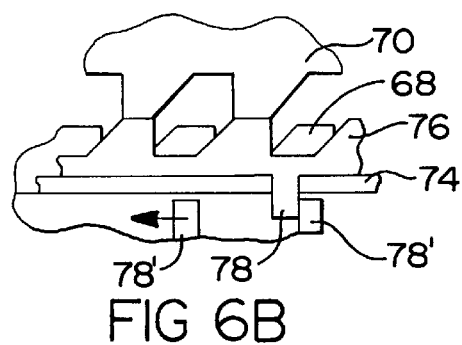

CLUTCH ASSEMBLY FOR AN EXERCISE APPARATUS

This is a continuation of U.S. patent application Ser. No. 08/595,738, filed Feb. 2, 1996 now U.S. Pat. No. 5,634,874.

BACKGROUND AND SUMMARY OF THE INVENTION

This invention relates to a portable exercising apparatus, and more particularly to a one-way clutch assembly for use in an exercise device.

It is well recognized that the human body requires a sufficient amount of proper exercise for stimulation and improvement of the cardiovascular system necessary for the maintenance of good health. In this regard, numerous exercising devices have been designed to achieve this goal. Some of the well known types of exercising devices employ weights which are lifted in a prescribed manner through a range of motion for exercising a particular set of muscles. Other well known types of exercising devices employ mechanisms, such as springs or rubber bands, to produce elastic resistance to movement in a particular direction. Still other well known types of exercising devices utilize a friction mechanism which generates a resistance proportional to relative movement of various components of the exercising device.

The above described devices are often directed to exercising and strengthening specific muscle groups. However, these devices are not readily adaptable to provide a portable exercise device which is simple to operate and effective for exercising all of the muscles of the upper anatomy. For example, prior art exercising devices for exercising the upper anatomy include U.S. Reissue Pat. No. 23,744 disclosing a pair of pivotal arms having a friction mechanism pivotally coupling a pair of extension arms. Similarly, U.S. Pat. No. 3,826,480 discloses a plunger type mechanism which utilizes a frictional resistance mechanism. Likewise, a variation of the multi-spring chest expander is disclosed in U.S. Pat. No. 5,437,591. While these and similar exercising devices generally exercise the muscle groups of the upper anatomy, none of these devices adequately exercise all of the muscle groups of the upper anatomy including the chest, shoulders, back and arms. Thus, there is a need to provide an exercising device which is compact, lightweight, simple to use and which operates in a manner to exercise all of the muscle groups of the upper anatomy.

In accordance with the present invention, an exercising device is provided which is particularly adapted for exercising the upper anatomy in a fly-type motion, whereby the user positions his or her forearms and elbows against a grip assembly and urges his or her elbows together against the resistance of the exercising device. The portable exercise device includes a slide assembly having a pair of cooperating curved slides and a rack formed on each of the slides. A spring-biased elastic resistance mechanism having a pinion is interdisposed between the cooperating slides to generate resistance to relative movement of the slides. The resistance mechanism further includes a brake disc assembly in combination with a clutch assembly for providing frictional resistance in a single direction. A grip assembly including a pair of arms pivotally connected at opposite ends of the cooperating slides are positionable between a stowed position for storing and transporting the device, and an extended position for placing the user's arms in the appropriate position for performing the fly type exercise as heretofore described.

Accordingly, it is a primary object of the present invention to provide a compact, portable, lightweight exercising device. As presently preferred, the exercising device is configured to enable a user to perform fly-type exercises for working the muscle grips of the upper anatomy. However, the exercising device may also be configured for other ranges of motion to exercise other muscle groups, such as biceps curls, leg curls and thigh crunches.

It is another object of the present invention to provide an exercising apparatus which is anatomically and ergonomically designed for the exercise to be performed such that it is simple and safe to use by able-bodied individuals and disabled individuals without the assistance of others.

It is yet another object of the present invention to provide a portable exercising apparatus which is readily adaptable to a wide range of individuals, including children, women and men.

It is still a further object of the present invention to provide an exercise device which utilizes an adjustable resistance mechanism in which the load is easily adjustable from a low resistance/high repetition aerobic mode to a high load/low repetition muscle building, anearobic mode.

It is another object of the present invention to provide a resistance mechanism which employs an elastic resistance mechanism and a frictional resistance mechanism having a clutch assembly for providing a quiet, smoothly operating resistance mechanism for creating constant resistance independent of the rate of loading.

It is an additional object of the present invention to provide an exercising apparatus which may be stowed in a compact arrangement for facilitating storage and transportation of the device.

Further objects, features and advantages of the invention will become apparent from a consideration of the following description and the appended claims when taken in conjunction with the accompanying drawings.

BRIEF DESCRIPTION OF THE DRAWINGS

FIG. 4 is a partial detail view of the grip assembly showing the detent for positively locking the grip assembly in a stowed or use position;

FIG. 5 is a cross sectional view taken through the exercising apparatus along line 5—5 of FIG. 2 illustrating the resistance mechanism of the present invention; and FIGS. 6A and B are detailed views of the clutch assembly utilized in the resistance mechanism of the present invention.

DETAILED DESCRIPTION OF THE PREFERRED EMBODIMENT

Figure 1:
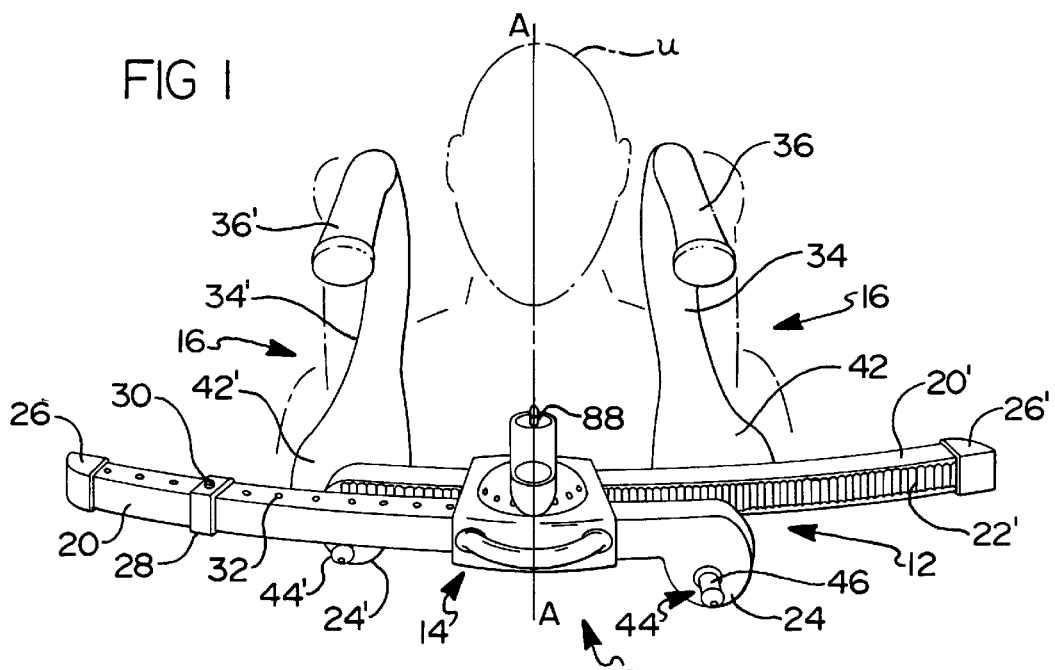
FIG. 1 is a pictorial view of a portable exercising apparatus having a slide assembly, a resistance assembly and a grip assembly for working the upper anatomy in a fly-type motion in accordance with the present invention.

With reference to FIG. 1, exercising apparatus 10, including arcuate slide assembly 12, resistance mechanism 14 and grip assembly 16 is shown in a use position. The arms of user U are generally bent at the elbow and positioned to engage grip assembly 16 along the medial portion of the elbow and forearm. Arcuate slide assembly 12 and resistance mechanism 14 are interdisposed between grip assembly 16 such that flexion of the arms of user U in an inward direction causes relative movement of cooperating slides 20, 20'. Arcuate slide assembly 12 allows resistance mechanism 14 to be positioned closely adjacent the chest of user U at full arm extension. The resulting movement of exercise device 10 during compression provides the necessary range of motion to appropriately exercise the upper, mid and lower pectoral muscles without excessive movement.

Figure 2:
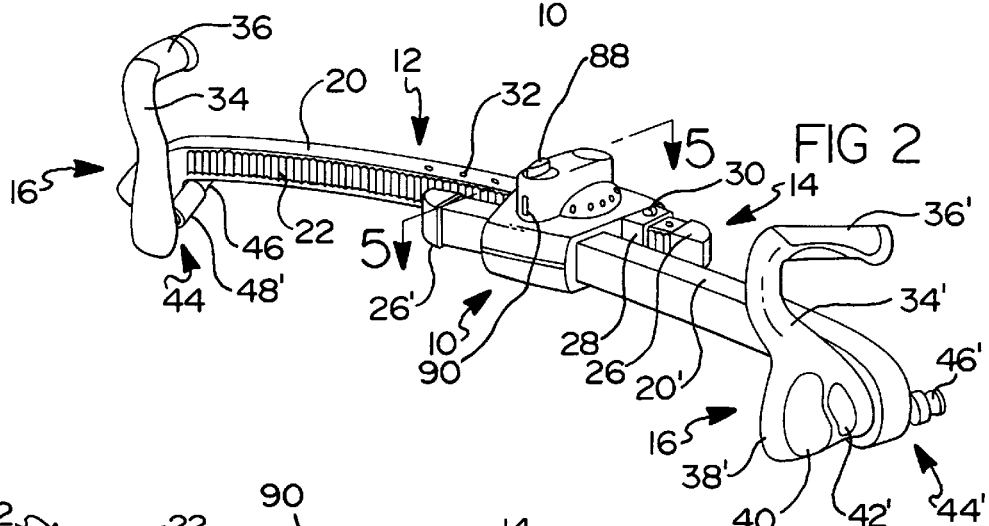
FIG. 2 is a perspective view of the present invention showing the grip assemblies in an extended, use position and the slide assembly in a fully extended condition.
Figure 3:
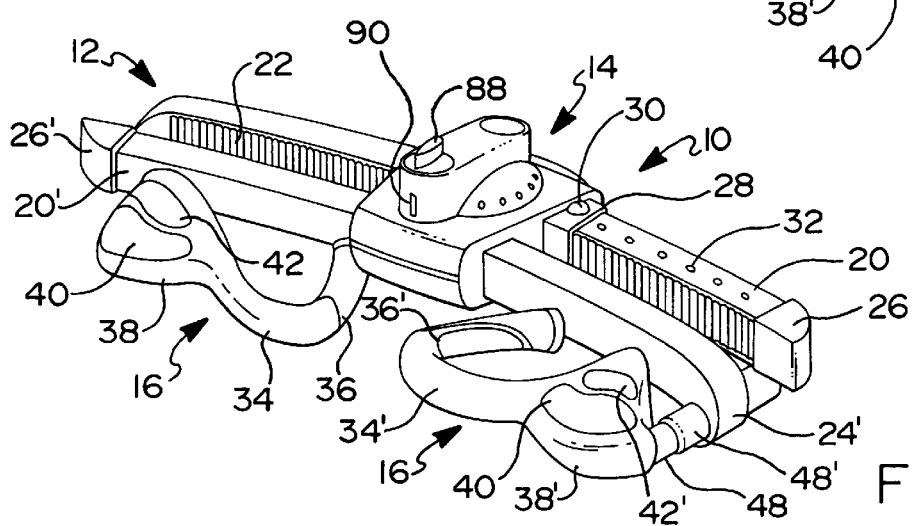
FIG. 3 is a perspective view of the present invention showing the exercise apparatus in a non-use condition having the grip assemblies in a stowed condition.

Referring now to FIGS. 1–3 as presently preferred, arcuate slide assembly 12 is a molded thermoplastic assembly which includes inner and outer curved slides 20, 20', adapted to translate relative to one and other in opposite concentric direction. As best seen in FIG. 1, slides 20, 20' are configured such that they rotate in a concentric fashion about an axis A—A which is preferably determined by the biomechanics of user U. As presently preferred, outer curved slide 20 has a radius of approximately 50 inches. Inner and outer slides 20, 20' includes rack portions 22, 22' formed on the interior face thereof. A downward portion 24 formed at the outboard end of slides 20, 20' provides clearance for rack portions 22, 22' as they rotate towards each other and further provides a location for pivotally connecting grip assembly 16 to exercising apparatus 10. End caps 26 are disposed on the inboard ends of slides 20, 20'.

Stop collar 28 is detachably secured over outer slide 20 and is adjustable along the outward portion thereof. Exercise device 10 readily adjusts for any arm span by laterally positioning stop collar 28 to precompress slide assembly 12 and resistance mechanism 14, thereby adjusting the range of motion for exercise apparatus 10. Furthermore, stop collar 28 may be positioned inwardly to fully compress and lock exercising apparatus 10 in a compact condition. More specifically, pin 30 extends through stop collar 28 into one of a plurality of apertures 32 formed in outer slide 20.

Referring now to FIGS. 1 and 2, grip assembly 16 includes left and right arm supports 34, 34' which are pivotally connected at the outboard ends of inner and outer slide 20, 20'. As can be readily appreciated from the drawings, right arm support 34' is a mirror image of left arm support 34. Accordingly, only a description of left arm support 34 is provided. Arm support 34 includes hand grip portion 36 which extends outwardly away from user U and elbow pad portion 38. As best seen in FIG. 2, elbow pad portion 38 has a large, generally flat portion 40 which provides a surface for engaging the elbows of user U and a contoured portion 42 which conforms to the shape of the elbow and forearm of user U. In this manner, elbow pad portion 38 is readily adaptable for a wide range of individuals having forearms of varying length. Likewise, hand grip portion 36 is disposed at a slightly downward angle relative to elbow pad portion, thus further adapting the exercise device 10 to a wide range of users. Referring to FIG. 4, grip assembly 16 further includes shaft assembly 44 extending through slide 20 to pivotally connect arm support 34 thereto. Boss portion 48 is formed on arm support 34 and boss portion 48' is formed on slide 20. Boss portions 48, 48' have adjacent complementation contoured faces which function as a detent for providing a positive mechanical lock to position arm support 34 in the stowed and extended position.

Shaft assembly 44 also includes shaft 46 extending from arm support 34 through slide 20 to pivotally connect arm support 34 thereto. Shaft assembly 44 may include a biasing spring (not shown) to urge boss portion 48 into locking engagement with boss portion 48'.

Referring now to FIGS. 2 and 5, resistance mechanism 14 operably couples inner outer and slide 20, 20' and provides rotary resistance to relative movement thereof. Pinion assembly 50 functions to operably couple inner and outer slide 20, 20' and is enclosed in housing 52. More specifically, pinion assembly 50 includes pinion shaft 54 journally supported within reinforced polymer housing 52 by a pair of bearings 56. Pinion gear 58 is disposed on pinion shaft 54 and engages rack portions 22, 22' for operably coupling inner and outer slide 20, 20'. Helical spring 60 is interconnected between a lower portion of housing 52 and pinion shaft 54 for rotationally biasing pinion assembly 50 and providing elastic resistance to relative movement of slides 20, 20'. More specifically, as pinion assembly 50 is rotated in response to relative translational movement of inner and outer slide 20, 20', helical spring 60 is wound and unwound, thereby providing elastic resistance to the relative movement. In addition, friction resistance mechanism 62 is disposed within an upper portion of housing 52 and operably coupled to pinion assembly 50 for providing frictional resistance to the relative movement of inner and outer slide 20, 20'. Frictional resistance mechanism 62 includes brake assembly 64 which generates frictional resistance to the relative movement of inner and outer slide 20, 20' and clutch assembly 66 which enables brake assembly 64 to be selectively engaged during compression of exercise apparatus 10 but disengages brake assembly 64 to bypass the frictional resistance during extension of the exercise apparatus. In this manner, exercising apparatus 10 provides a load condition when the apparatus is manipulated inwardly towards its fully compressed condition and a no load condition when the apparatus is manipulated outwardly to its fully extended position. Thus, as presently preferred, exercise device 10 includes helical spring 60 for providing an elastic resistance mechanism and frictional resistance mechanism 62 for providing a dissipating resistance mechanism. One skilled in the art would readily recognize that weighted disks or a hydraulic vane assembly could be adapted into the present invention for providing resistance mechanism without varying from the scope of the present invention.

Clutch assembly 66 includes drive member 68 integrally formed on an upper portion of pinion shaft 54 and driven member 70 operably coupled to brake assembly 64. As best seen in FIGS. 6A and 6B, drive member 68 and driven member 70 have multiple teeth formed thereon to provide positive engagement of drive member 68 with driven member 70 of clutch assembly 66. The teeth of each of the clutch members have two different angles formed thereon: a right angle, α, formed on one side for providing locking engagement when pinion shaft 54 is rotated in a first direction during compression of the exercise apparatus and an obtuse angle, β, formed on another for providing sliding engagement when pinion shaft 54 is rotated in a second direction opposite the first direction. Furthermore, spring member 72 is interdisposed between driven member 70 and housing 52 to bias driven member 70 onto drive member 68 thereby facilitating positive engagement therebetween. In this manner, clutch assembly 66 provides positive engagement between pinion shaft 54 and brake assembly 64 in an engaged direction, while disengaging brake assembly 64 and allowing it to remain fixed while pinion shaft 54 rotates in a second, free wheeling direction opposite the first direction.

Referring now to FIGS. 6A and 6B, clutch assembly 66 is shown in further detail. More specifically, drive member 68 includes low friction disc 74 interdisposed between a first stepped portion formed on pinion shaft 54, and drive clutch member 76 having clutch teeth similar to those previously described formed thereon. Drive clutch member 76 is concentrically located on a second stepped portion of pinion shaft 54 adjacent drive member 68 which is configured on the pinion shaft 54. As best seen in FIG. 6A, the profile of the teeth formed on clutch member 76 is slightly higher than the profile of the teeth formed on drive member 68. Furthermore, stop tabs 78 are formed on the bottom portion of clutch member 76 to engage complementary stop tabs 78' formed in the second stepped portion of pinion shaft 54.

During retention for power transmission, i.e. when the pinion shaft is coupled to the brake assembly, drive member 68 and clutch member 76 engage driven member 70 in the manner heretofore described. However, during counter rotation, driven member 70 engages clutch member 76 which is rotated out of phase due to the slight size difference between clutch member 76 and drive member 68 as well as frictionless disc 74. Stop tab 78 formed on clutch member 76 engages stop tap 78' formed on pinion shaft 54 to position clutch member 76 out of phase from drive member 68 by approximately one half of the circular pitch. In this position, the teeth of clutch member 76, block the space between the teeth of drive member 68, thereby providing a relatively flat surface upon which the teeth of driven member 70 may rotate. In this manner the clicking sound typically generated by up and down movement of the freewheeling clutch member is eliminated.

Referring again to FIG. 5, brake assembly 64 includes brake hub 80 operably coupling brake assembly 64 to clutch assembly 66. Wear-resistant steel brake disc 82 extends radially from brake hub 80. Fixed brake pad 84 is disposed within a portion of housing 52 adjacent the lower surface of brake disc 82. Adjustable brake pad 86 is disposed adjacent threaded adjuster 88 on the upper surface of brake disc 82. Threaded adjuster 88 is disposed within housing 52 and is adapted to vertically position resistance indicator 90, thereby applying a clamping force upon adjustable brake pad 86 urging brake pads 84 and 86 into engagement with brake disc 82 to provide frictional resistance to motion thereof. Spring 92 is interdisposed between resistance indicator 90 and adjustable brake pad 86 to bias adjustable brake pad 86 towards brake disk 82. Resistance indicator 90 also provides a visual indication of the frictional resistance being applied by brake assembly 64.

Referring now to FIGS. 1–3, a brief description of the operation of the present invention will be provided. As shown in FIG. 3, exercise device 10 is positioned in its stowed, portable position. Grip assembly 16 is pivotally positioned such that elbow pad portions 38, 38' are approximately parallel with inner and outer slide 20, 20' and hand grip portion 36, 36' are partially beneath inner slide 20'. Stop collar 28 has been positioned to its inboard most location to engage housing 52 of resistance mechanism 14. In this manner, stop collar 28 prevents helical spring 60 from extending exercise apparatus 10 into its fully extended position.

When exercise apparatus 10 is to be used, pin 30 is removed and stop collar 28 is positioned in an outboard location as heretofore described to set the range of motion to which exercise device 10 is configured. In this condition, helical spring 60 biases inner and outer slides outwardly into an extended position. Likewise, grip assembly 16 has been pivotally positioned from its stowed position into an extended, use position, whereby elbow pad portions 38, 38' are generally perpendicular to slide assembly 12.

During use of exercise device 10, user U applies an inward force to grip assembly 16 causing relative movement of inner and outer slide 20, 20'. Rack portions 22, 22' formed on slides 20, 20' engage pinion gear 58 causing pinion shaft 54 to rotate. The cooperation of pinion gear 58 with rack portions 22, 22' formed on inner and outer slides 20, 20' maintains resistance mechanism 14 in the center portion of exercise device 10 as slides 20, 20' move inwardly and outwardly. As exercise device 10 is further positioned to its fully compressed position, pinion shaft 54 causes helical spring 60 to be loaded to create elastic resistance to the motion and further rotates brake assembly 64 thus providing frictional resistance to the relative translational movement of inner and outer slide 20, 20' at a constant load independent of the rate of manipulation.

Once exercise device 10 is in the fully compressed position, user U releases the inwardly directed force. Helical spring 60 counter rotates pinion shaft 54 causing relative movement of slide 20, 20' in an outward direction. As a result of the counter rotation of pinion shaft 54, clutch assembly 66 is positioned into a freewheeling condition whereby brake assembly 64 is disabled. Thus, no frictional resistance is generated to the outward, relative translational movement of inner and outer slide 20, 20'.

While the present invention has been described with particular reference to an exercising device configured to exercise the upper anatomy, one skilled in the art would readily recognize the present invention may be employed in other exercising device application for exercising other portions of the body including arm muscle groups, leg muscle groups and lower torso muscle groups by adapting additional and/or substitute grip assemblies thereto. As with the portable upper anatomy exercising device, exercising devices for the other muscle groups may be readily adapted to the anatomical and ergonomic requirements thereof.

The foregoing discussion discloses and describes exemplary embodiments of the present invention. One skilled in the art will readily recognize that from such discussion and from the accompanying drawings and claims, that various changes, modifications and variations can be made therein without departing from the spirit and true scope of the invention as described in the following claims.

What is claimed is:

1. A clutch assembly for selectively coupling a source and a load, the clutch assembly comprising:

a drive member operably coupled to the source for movement therewith in a first direction and a second direction, said drive member having a plurality of teeth formed thereon;

a drive clutch member disposed adjacent said drive member and operably coupled to said drive member for movement therewith, said drive clutch member having a plurality of teeth formed thereon;

a driven member operably coupled to the load and having a plurality of teeth formed thereon such that said teeth of said driven member engage said teeth of said drive member when said drive member is moved in said first direction; and a stop member interdisposed between said drive member and said drive clutch member to position said teeth of said drive clutch member relative to said teeth of said drive member when said drive member is moved in said second direction to disengage said drive member from said driven member.

2. The clutch assembly of claim 1 wherein said stop member positions said teeth of said drive clutch member to block a gap formed between said teeth of said drive member when said drive member moves in said second direction.

3. The clutch assembly of claim 2 wherein said drive clutch member is shifted approximately one-half of the width of said teeth of said drive member when said drive shaft is moved in said second direction.

4. The clutch assembly of claim 2 wherein a top surface of said teeth of said drive member and a top surface of said teeth of said drive clutch member define a substantially flat surface.

5. The clutch assembly of claim 1 wherein said stop member further comprises:

a first stop tab formed on said drive member; and a second stop tab formed on said drive clutch member and engaging said first stop tab when said drive member is moved in said second direction.

6. The clutch assembly of claim 1 wherein said teeth formed on said drive clutch member have a profile slightly higher than a profile of said teeth formed on said drive member.

7. The clutch assembly of claim 1 further comprising a spring urging said teeth of said driven member into engagement with said teeth of said drive member.

8. The clutch assembly of claim 1 further comprising a reduced friction member interdisposed between said drive member and said drive clutch member.

9. A clutch assembly for selectively coupling a source and a load, the clutch assembly comprising:

a drive shaft operably coupled to the source for rotation in a first direction and a second direction;

a drive member formed on an end of said drive shaft and having a plurality of teeth formed thereon;

a drive clutch member concentrically located on said end of said drive shaft adjacent said drive member and operably coupled to said drive shaft for rotation therewith, said drive clutch member having a plurality of teeth formed thereon;

a driven member operably coupled to the load, said driven member having a plurality of teeth formed thereon axially aligned with and disposed adjacent to said teeth formed on said drive member such that said teeth of said driven member engage said teeth of said drive member when said drive shaft is rotated in said first direction;

a stop member positioning said teeth of said drive clutch member relative to said teeth of said drive member when said drive shaft is rotated in said second direction to disengage said teeth of said drive member from said teeth of said driven member.

10. The clutch assembly of claim 9 wherein said stop member positions said teeth of said drive clutch member to block a gap formed between said teeth of said drive member.

11. The clutch assembly of claim 10 wherein said drive clutch member is rotated approximately one half of the circular pitch of said teeth of said drive member when said drive shaft is rotated in said second direction.

12. The clutch assembly of claim 10 wherein a top surface of said teeth of said drive member and a top surface of said teeth of said drive clutch member define a substantially flat surface.

13. The clutch assembly of claim 10 wherein said stop member further comprises:

a first stop tab formed on said drive shaft; and a second stop tab formed on said drive clutch member and engaging said first stop tab when said drive shaft is rotated in said second direction.

14. The clutch assembly of claim 9 wherein said teeth formed on said drive clutch member have a profile slightly higher than a profile of said teeth formed on said drive member.

15. The clutch assembly of claim 9 further comprising a spring urging said teeth of said driven member into engagement with said teeth of said drive member.

16. The clutch assembly of claim 9 further comprising a reduced friction member interdisposed between said drive member and said drive clutch member.

* * * * *